Patented June 1, 1937

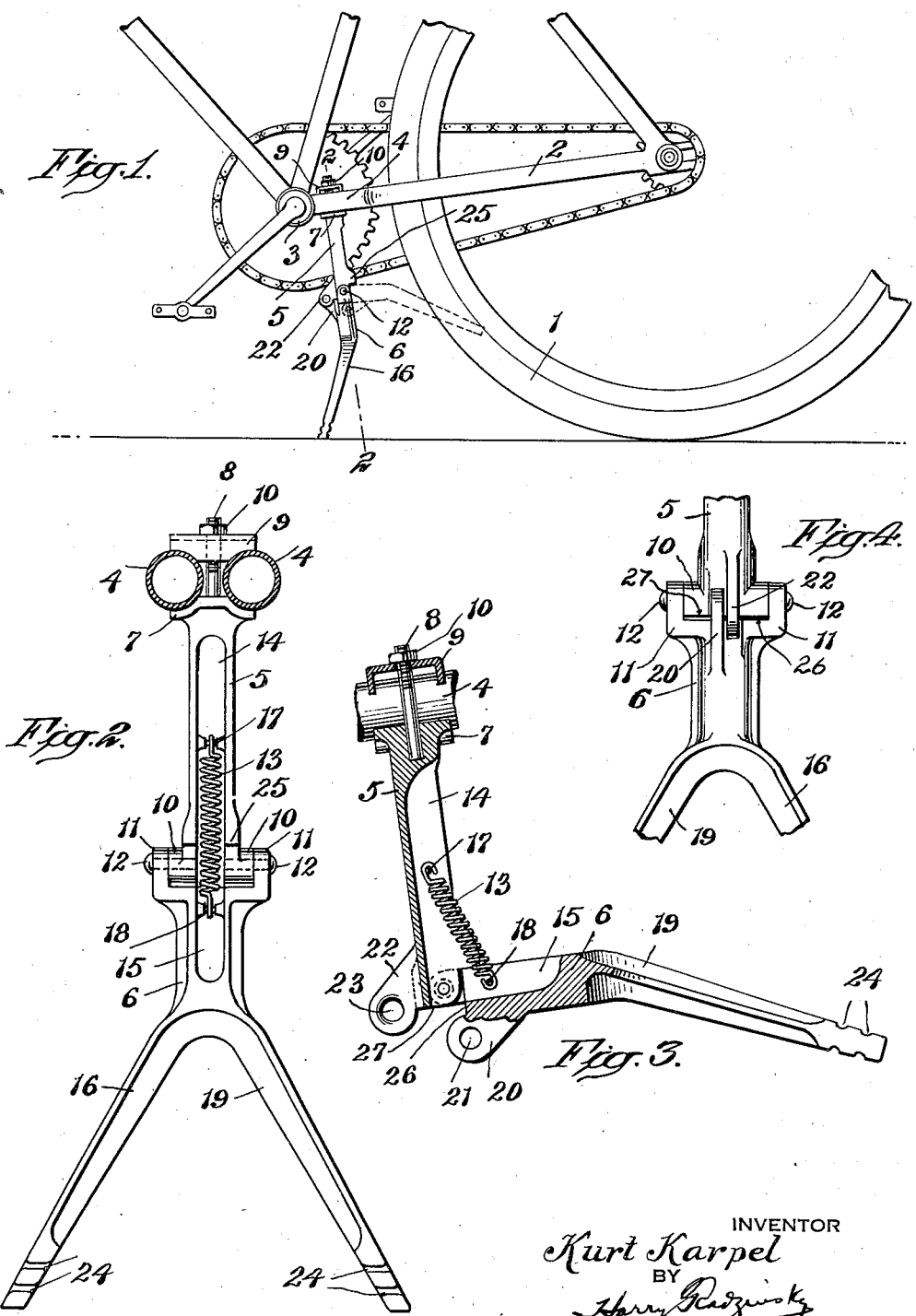

2,082,248

UNITED STATES PATENT OFFICE 2,082,248

SUPPORTING STAND FOR BICYCLES

Kurt Karpel, New York, N. Y.

Application March 11, 1936, Serial No. 68,217

3 Claims. (Cl. 208—79)

This invention relates to stands or supports for bicycles, and has for its object the provision of a simple, easily-constructed device intended for attachment to a bicycle for supporting the same in an upright position when not in use. A further object of the invention resides in means by which the improved stand or support may be locked in its extended or operative position, thereby preventing the use of the bicycle until the locking means is released and the stand folded up.

More particularly the device comprises a body portion provided with a clamp by which it is attached to the frame of a bicycle at a point near the rear fork thereof, said body portion being pivotally connected to a forked supporting leg which when extended downwardly from the body portion, rests upon the ground and supports the bicycle. Lugs are provided on both parts of the device so disposed as to be located in registration when the supporting leg is in its extended position whereby a lock passed through apertures in the lugs will prevent folding movement of the supporting leg relative to the body portion, thereby holding the supporting leg locked in its extended, operative position.

Other features of novelty are included in the device as will be apparent from the following specification and appended claims.

In the accompanying drawing, wherein an embodiment of the invention is shown, Fig. 1 is a side view of a portion of a bicycle, showing the improved supporting stand attached thereto; Fig. 2 is a sectional view on the line 2—2 of Fig. 1, looking in the direction of the arrows; Fig. 3 is a sectional view through the stand, the view being taken at right angles to that of Fig. 2; and Fig. 4 is a front view of the pivot of the stand, showing the lugs formed on the body portion and supporting leg for the reception of a lock.

In Fig. 1 certain conventional parts of a bicycle are shown, consisting of the rear wheel 1, mounted in the rear fork 2, the fork being connected to the pedal-shaft bearing 3 by the two spaced frame elements 4. All of these elements are common in bicycles and form no part of the invention. The improved supporting stand is composed of two main elements, comprising the body portion 5 and attached pivoted supporting leg 6. Body portion 5 is preferably a channelled casting or stamping formed at its upper end with a clamping plate 7. A threaded stud 8 secured in the body portion 5 extends upwardly from plate 7. A movable clamping plate 9 fits on the stud 8, and the two frame elements 4 are clamped between plates 7 and 9 in the manner clearly shown in Fig. 2 by the nut 10 received on the stud 8.

When the device is clamped in position on the bicycle at a point between the pedal bearing 3 and rear fork 2, the body portion 5 of the stand extends vertically downward in front of the rear wheel as clearly seen in Fig. 1. At its lower end, the member 5 is formed with the bosses 10 which fit in the clevis 11 formed on the upper end of the supporting leg 6 and are pivoted therein by the pivot pins 12. A coil spring 13 normally lies in the co-operating channels 14 and 15 of the body portion and leg respectively, the ends of the spring being attached to pins 17 and 18. At its front the leg 6 is formed with a projecting lug 20 provided with an aperture 21 and when the leg is in its supporting position, as shown in Figs. 1 and 2, lug 20 overlies a similar lug 22 (Figs. 1 and 4) formed at the lower end of the body portion 5. Lug 22 is formed with an aperture 23 (Fig. 3) and the two apertures 21 and 23 are located in registration when the device is in its position of support, so that a lock may be passed through these apertures and will hold the stand in its operative, supporting position. The lower end of the leg 6 is forked or provided with divergent feet 16 and 19 which are arranged to be cut off at any desired point to suit the height of the rear wheel 1, or the size of the bicycle. To enable the purchaser to easily sever off any unrequired sections of the feet 16 and 19, the feet are grooved as shown at 24, said grooves acting as guides to aid in the cutting away of the unwanted parts of the feet.

While the bicycle is being ridden, the supporting leg 6 is held in a raised position and angularly with respect to the body portion 5 by means of the spring 13, as clearly shown in Fig. 3, and as indicated in dotted lines in Fig. 1. When leg 6 is raised to this position, it will be seen that the divergent feet 16 and 19 straddle the rear wheel so as not to interfere with its rotation. When the rider wishes to support his bicycle in a position of rest, he merely pushes down the leg 6 to a vertical position to bring the feet 16 and 19 to rest on the ground. By passing a lock through apertures 21 and 23 on lugs 20 and 22, the stand will be held in its extended or operative position and the bicycle cannot be ridden until the lock is removed and the leg 6 raised. Stops 25 formed on the body portion 5 limit the upward angular movement of the supporting leg 6, and the portion 26 on leg 6, abutting against the parts 27 of the body portion 5 limits the movement of the supporting leg relative to the body portion 5 when the supporting leg reaches its vertical position of support.

The device being of simple construction and composed of few parts may be made light and sturdy and will stand a great deal of use and wear without becoming broken or damaged.

What I claim is:

1. A supporting stand of the character described comprising, a body portion having a clamping plate formed on its upper end, a stud projecting upwardly from said plate, a second clamping plate fitting said stud and co-operating with the first plate to clamp a bicycle frame adjacent to its rear fork, with the body portion projecting downwardly from the point of clamping engagement, a supporting leg pivoted at the lower end of the body portion, said leg having divergent feet adapted to rest upon the ground and support the bicycle, a spring for raising the leg and holding it at an angle to the body portion in a non-supporting position, stop means for limiting the upward angular movement of the leg, stop means for limiting movement of the leg relative to the body portion when the leg is in its supporting position, and means on the body portion and leg for engagement by a lock to hold the body portion and leg fixed relative to one another when the leg is in its supporting position.

2. A supporting stand of the character described comprising, a body portion consisting of a channelled bar formed with a boss at its lower end and a clamping plate on its upper end, means co-operating with said clamping plate to clamp a bicycle frame in front of its rear fork, a supporting leg having a clevis formed on its upper end straddling the boss and pivotally attached thereto, said leg having divergent feet adapted to rest on the ground and support the bicycle, said leg being formed with a channel, a spring having its opposite ends respectively secured in the channel on the body portion and the channel on the leg, said spring normally tending to raise the leg and hold it at an angle to the body portion in a non-supporting position, stop means on the boss and within the clevis for limiting the upward angular movement of the leg relative to the body portion when the leg is in its supporting position, and loops formed on the front of the body portion and leg, and adapted to overlie one another for engagement by a lock to hold the body portion and leg fixed relative to one another when the leg is in its supporting position.

3. A supporting stand of the character described comprising, a body portion clamped on a bicycle frame in advance of the rear fork thereof, said body portion having a pivoted extension leg formed with a forked lower end thereby providing divergently extending supporting feet, said feet being formed with a plurality of spaced grooves extending transversely of them and forming guides to aid in shortening the length of the feet to accommodate them to bicycles of different sizes, and means for holding the leg raised and angularly positioned relative to the body portion, with its forked end straddling the rear wheel of the bicycle.

KURT KARPEL.